Jan. 7, 1969
W. V. CHILDS
3,420,713
PROCESS OF OPERATING A FUEL CELL WITH AN
ALIPHATIC MONOAMIDE FUEL
Filed June 4, 1964
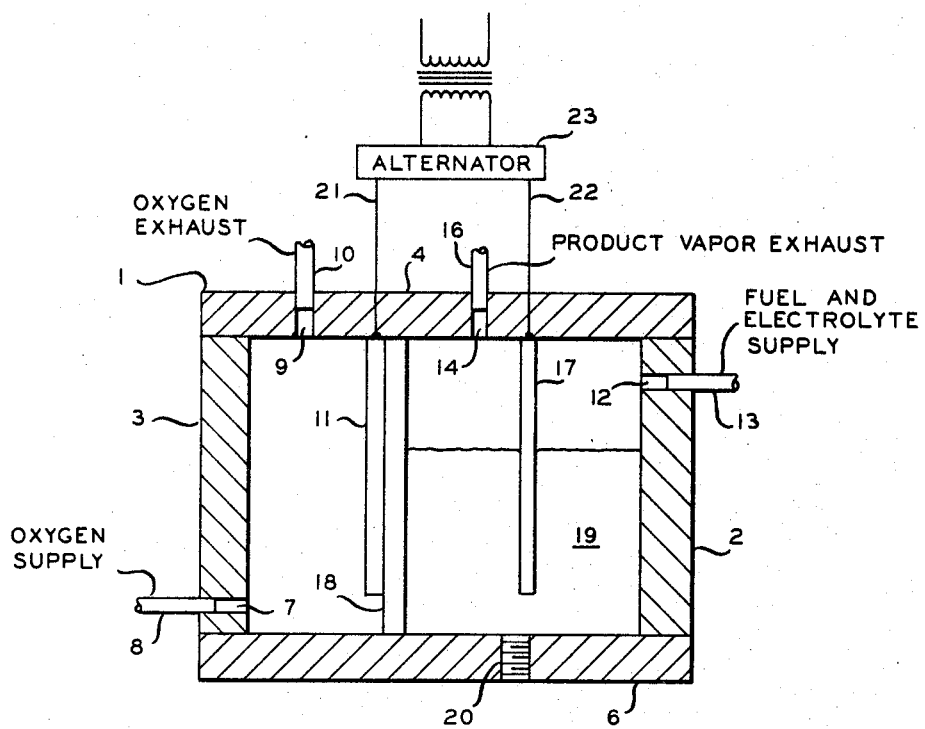
INVENTOR.
W. V. CHILDS
BY *Young & Lugg*
ATTORNEYS United States Patent Office 3,420,713
Patented Jan. 7, 1969

3,420,713
PROCESS OF OPERATING A FUEL CELL WITH AN ALIPHATIC MONOAMIDE FUEL
William V. Childs, Bartlesville, Okla., assignor to Phillips Petroleum Company, a corporation of Delaware
Filed June 4, 1964, Ser. No. 372,551
U.S. Cl. 136—86    4 Claims
Int. Cl. H01m 27/02

ABSTRACT OF THE DISCLOSURE

A process of generating electrical energy in a fuel cell having a catalytic anode in contact with an electrolyte and a catalytic cathode separated from the electrolyte by an ion exchange membrane, the cathode being in contact with the membrane, by passing a liquid fuel selected from aliphatic monoamides of carboxylic acid having 1 to 12 carbon atoms to the anode, and passing an oxygen-containing gas to the cathode.

---

This invention relates to a method and apparatus for generating electric current by means of an electrochemical reaction. In another aspect, this invention relates to a method and apparatus for generating electric current by means of an electrochemical reaction conducted in a fuel cell utilizing as a fuel an amide of a carboxylic acid.

Presently employed conventional methods of generating electrical energy are known to be relatively inefficient. When electrical energy is generated from the heat of a chemical reaction, a fuel is generally oxidized by air and the chemical energy of the fuel converted into heat and mechanical energy. The heat and mechanical energy are then employed in gas turbines or steam turbines connected to so provide the electrical energy. The overall efficiency of the conversion of the chemical energy of the fuel into electrical energy is considerably less than about 50 percent. To avoid this inefficiency, it has been suggested that fuel cells be employed to convert the chemical energy of the fuel directly into electrical energy without the intermediate conversion of the fuel energy into heat and mechanical energy.

A fuel cell basically comprises an electrolyte and two electrodes and is designed to generate electric current by means of an electrochemical reaction in the cell between fuel, such as hydrogen and an oxidant, such as air, when power is demanded by an external load. As the effectiveness of the fuel cell operation is directly dependent upon the efficient utilization of the fuel employed, the oxidant and the fuel should be capable of a rapid reaction which is as complete as possible. An electrochemical reaction if sluggish is of little value when employed in fuel cells. If the electrochemical reaction is so incomplete that one or more of the reactants is wastefully used, resulting perhaps in accumulation of intermediate products, which ultimately slow or even stop the reaction, the chemical reaction is of little value in fuel cells. With fuel cell systems, it is particularly necessary that the fuel and oxidizer react easily and cleanly, leaving little or no partially combusted fragments which could interfere with normal cell operation.

Accordingly, an object of my invention is to provide an improved method and apparatus for generating electric current by means of an electrochemical reaction.

Another object of my invention is to provide a fuel cell utilizing a novel and improved fuel.

Other objects, advantages and features of my invention will be readily apparent to those skilled in the art from the following description, the drawing and appended claims.

By my invention, I have provided an improved fuel cell utilizing as a novel fuel an amide of a carboxylic acid which is easily and cleanly oxidized within the fuel cell.

The drawing is a cross-sectional view in elevation of one embodiment of the fuel cell of my invention.

For a better understanding of the invention, reference is now made to the drawing wherein a fuel cell generally designated 1 is illustrated. Fuel cell 1 comprises a generally rectangular casing or holder made of a suitable inherent non-conductive material, such as plastic, e.g., Lucite. The fuel cell casing can be made in segments, such as its outer segments 2, 3 and a top segment or closure plate 4 and bottom segment or closure plate 6. Such casing segments can be secured together by bolts, bands, etc., with suitable sealants, such as asbestos fiber, or sealing means such as O-rings, between adjacent segments.

Extending through cell segment 3 is a passage 7 communicating with an oxygen supply line 8. Extending through cell segment 4 is a passage 9 in communication with conduit 10 for the exhaust of the oxygen gas from fuel cell 1. Disposed within fuel cell 1 is an electrode 11 (cathode) positioned so as to be directly contacted by the oxidant gas flowing through passage 7 into fuel cell 1. Cell segment 2 is provided with a passage 12 communicating with a fuel and electrolyte supply conduit 13. Cell segment 4 also contains a passage 14 communicating with a conduit 16 for the exhaust of product vapors from fuel cell 1. Disposed within fuel cell 1 is an electrode 17 (anode). Disposed within fuel cell 1 and positioned adjacent cathode 11 is a cationic ion exchange membrane 18.

That portion of the fuel cell bounded by the ion exchange membrane 18, and cell segments 2, 4 and 6 is partially filled with a liquid mixture 19 of an electrolyte and a fuel hereinafter described. The bottom closure plate 6 is provided with a suitable plug and opening 20 for draining the electrolyte and fuel liquid mixture from the cell when desired.

Each of the electrodes 11, 17 is connected to suitable conductors 21, 22, respectively, to complete an external circuit. Conductors 21, 22 can be connected to a suitable load; for example, they can be connected to an alternator 23 or the like for the conversion of the low voltage direct current, e.g., 0.5:1.50 volts, to alternating current, which can have its voltage stepped up by a transformer. A plurality of such fuel cells can be connected in series or parallel, or a combination thereof.

Catalytic activity is a necessary characteristic of the fuel cell electrodes except at extremely high temperatures. Other necessary characteristics are electrical conductivity and non-corrosivity in the electrolyte being used. Conventional catalytically active electrodes such as those comprising platinum black on a nickel substrate are suitable as cathodes. Similarly, electrodes comprising nickel boride can be used as anodes. In general, any conventional materials which are suitably active can be used as the fuel cell cathode and as the fuel cell anode in the fuel cell of my invention. The electrodes can be porous or solid and can be fabricated in any desired shape, for example, in cylinders, discs, etc., and two or more of them can be employed in the fuel cell.

The electrolyte employed in the inventive fuel cell is one which is compatible with an amide in the operating temperature range of the fuel cell, can provide sufficient conductivity, and one that is more difficult to oxidize at the anode than the amide employed as the fuel. Suitable electrolytes include the alkali metal salts such as sodium chloride, potassium bromide, lithium nitrate, rubidium perchlorate (caution should be employed when utilizing nitrate and perchlorate salts as there is some danger of violent decomposition at the high temperatures when employed in the fuel cell and under anhydrous conditions). Suitable organic electrolytes include alkali metal benzene sulfonates (e.g., sodium benzene sulfonates) and alkali metal short chain alkyl benzene sulfonates (e.g., potassium orthotoluene sulfonates). Preferred electrolytes are the alkali metal formamide salts (sodium formamide, potassium formamide, etc.). A membrane of ion-exchange resin capable of ion transfer can also be employed as an electrolyte in the fuel cell of my invention.

When the alkali metal salts are employed as the electrolyte in the fuel cell of my invention, the said alkali metal salts can be dissolved in the liquid fuel or can be employed as an aqueous solution of the said alkali metal salt. When employing an aqueous solution of an alkali metal salt as an electrolyte, the liquid fuel and aqueous electrolyte solution can be thoroughly and continuously mixed within the fuel cell or prior to addition to the fuel cell, thereby forming a solution or emulsion.

The liquid fuels employed in the fuel cell of my invention are formamide and other aliphatic amides of carboxylic acids having up to 12 carbon atoms per molecule. As employed in the fuel cell, the fuels are preferably maintained in the liquid phase either by operation above the melting point of the fuel or by use of a suitable solvent for the fuel. Suitable fuels include formamide, acetamide, alpha-methylbutyramide, alpha-beta-dimethylvaleramide, beta-ethylcaprylamide, lauramide, mixtures of said amides, and the like. An inert solvent such as water or other material which is more resistant to oxidation than the amide can be used in the fuel cell to dissolve the amide fuel if the cell is operated at a temperature which is below the melting point of the specific amide employed. As previously noted under certain operating conditions, the liquid amide fuel or solution thereof can be employed as a solvent for the fuel cell electrolyte.

As oxidants, any oxygen-containing gas can be employed in the inventive fuel cell, preferably air, oxygen or oxygen-depleted air. The oxidant employed should contain at least 5 mol percent oxygen.

The presence of some water is necessary for the operation of the cell. The amount of by-product water, however, is more than enough to satisfy this requirement. A small amount of water, if none is already present, can be added to aid start-up operations. To assure the presence of adequate water, oxidant gas saturated with water vapor can be used in normal operation as well as start-up.

It is desirable for the most efficient fuel cell operation that the liquid amide fuel be isolated from the cathode. Referring to the drawing, it is seen that an anionic ion-exchange membrane 18 isolates the liquid amide fuel from cathode 11. Although a cationic ion-exchange membrane is therein illustrated, other types of membranes such as anionic ion-exchange membranes and other solid materials permitting ion transfer but preventing the transfer of the liquid amide fuel can also be employed. It is also within the scope of this invention to operate a fuel cell without the physical barrier 18, introducing the liquid amide fuel into the fuel cell adjacent to the anode such that contact of the fuel with the cathode is substantially prevented and operating the fuel cell under conditions so as to substantially complete the combustion of the liquid amide fuel at the anode but such operation is not the preferred mode.

Generally, the amide fuel cell of my invention is operated in the range of 100–190° C., with the particular temperature employed depending upon the amide used and the type of fuel cell involved. For example, when a semi-permeable ion exchange membrane is utilized within the cell, it is preferred, due to temperature limitations of that material, to operate at a temperature which is not substantially greater than the temperature at which degradation occurs. It is within the scope of this invention to operate the fuel cell of my invention under any convenient pressure.

The following equations, using formamide as an illustration, are believed to be applicable to the inventive fuel cell system:

Anode reaction

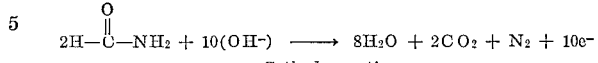

Cathode reaction $$5/2 O_2 + 5H_2O + 10e^- \longrightarrow 10(OH)^-$$

Overall reaction

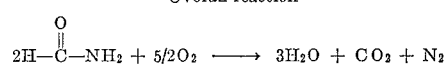

The following example is presented to illustrate the objects and advantages of my invention. It is not intended that the invention should be limited to the specific embodiments presented therein.

EXAMPLE

A fuel cell similar to that of the drawing is charged with an electrolyte comprising sodium formamide dissolved in formamide. The cell is separated into two compartments by a semi-permeable anionic ion exchange membrane which is coated, on the oxidant side, with a thin catalytic film of platinum which also serves as a cathode. A solid electrode coated with nickel boride serves as the anode. The anode and cathode are suitably connected to an external load. Air, humidified by passing through water, is continuously fed into the inlet side of the oxidant compartment and formamide is continuously fed into the fuel compartment. Operating at 100° C. electric power generated with the cell is drawn off while water vapor, carbon dioxide and nitrogen are discharged from the anode vent.

As will be evident to those skilled in the art, various modifications of the invention can be made, or followed, in the light of the foregoing disclosure, without departing from the spirit or scope thereof.

I claim:

1. A process of generating electrical energy in a fuel cell comprising two compartments separated by an ion exchange membrane, the first compartment containing an electrolyte and a catalytic anode at least partially immersed therein and the second compartment containing a catalytic cathode in contact with said ion exchange membrane, said process comprising introducing a liquid fuel selected from aliphatic monoamides of carboxylic acid having up to 12 carbon atoms per molecule and solutions thereof in inert solvents into said first compartment thereby admixing with said electrolyte, and passing an oxygen-containing gas to said second compartment to contact said cathode, water vapor being added to said oxygen-containing gas at least during the beginning of said process.

2. The process of claim 1 wherein said fuel is formamide.

3. The process of claim 2 wherein said electrolyte is sodium formamide.

4. The process of claim 3 wherein said fuel cell is maintained at a temperature in the range of 100°–190° C.

References Cited

UNITED STATES PATENTS

| 2,597,456 | 5/1952 | Coleman et al. | 136—100 |
| 3,083,251 | 7/1963 | Moos | 136—86 |
| 3,117,032 | 1/1964 | Panzer. | |
| 3,260,620 | 3/1966 | Gruber | 136—86 |

WINSTON A. DOUGLAS, *Primary Examiner.*

H. FEELEY, *Assistant Examiner.*